(12) United States Patent  
Hagen (10) Patent No.: US 6,746,047 B2
(45) Date of Patent: Jun. 8, 2004

(54) DECORATIVE REAR WINDOW PROTECTOR FOR TRUCKS

(76) Inventor: Shawn Hagen, 376 Point of View, Edwardsville, IL (US) 62025

( * ) Notice: Subject to any disclaimer, the term of this patent is extended or adjusted under 35 U.S.C. 154(b) by 0 days.

(21) Appl. No.: 10/191,544

(22) Filed: Jul. 10, 2002

(65) Prior Publication Data

US 2004/0007861 A1 Jan. 15, 2004

(51) Int. Cl.[7] .............................................. B60R 21/12
(52) U.S. Cl. ...................................... 280/748; 280/756
(58) Field of Search ................................ 280/748, 762, 280/770, 756; 296/3, 97.4; 224/405; D12/167, 183, 190, 222, 400, 414.1, 406, 412

(56) References Cited

U.S. PATENT DOCUMENTS

| 2,799,530 | A | * | 7/1957 | Drake ......................... 296/106 |
| 4,405,170 | A | | 9/1983 | Raya ........................... 296/10 |
| 4,564,216 | A | | 1/1986 | Kinyon et al. ............... 280/770 |
| 4,611,824 | A | | 9/1986 | McIntosh ..................... 280/748 |
| 4,692,845 | A | | 9/1987 | Widhalm et al. ............. 362/80 |
| 4,715,643 | A | * | 12/1987 | Butler L. ..................... 296/152 |
| 4,867,497 | A | * | 9/1989 | Jayne ............................ 296/3 |
| 4,953,908 | A | * | 9/1990 | Dondlinger .................. 296/97.4 |
| 5,061,000 | A | | 10/1991 | Haugen et al. ................ 296/3 |
| D337,556 | S | | 7/1993 | Gros ......................... D12/167 |
| 5,258,893 | A | | 11/1993 | Finneyfrock ................. 362/61 |
| 5,316,190 | A | | 5/1994 | Bullock ..................... 224/42.42 |
| 5,608,806 | A | * | 3/1997 | Hinojosa ..................... 381/86 |
| D381,306 | S | | 7/1997 | Sauerwein .................. D12/190 |
| D388,385 | S | * | 12/1997 | Protz, Sr. ................... D12/167 |
| D393,622 | S | | 4/1998 | Goertzen ................... D12/426 |
| 5,882,058 | A | | 3/1999 | Karrer ....................... 296/39.2 |

FOREIGN PATENT DOCUMENTS

EP         0812735 A2 * 12/1997 ........... B60R/21/00

* cited by examiner

*Primary Examiner*—Charles T. Jordan
*Assistant Examiner*—Kimberly S. Smith
(74) *Attorney, Agent, or Firm*—Richard C. Litman (57) ABSTRACT

An aesthetically pleasing rear window protector for pickup trucks is made up of a main arcuate member and one or several smaller arcuate members that are welded at their ends to the main member and to each other to form any of various alternative arrangements. The rear window protector is used to protect the occupants of the truck from very large moving objects, such as a lawn mower, that might otherwise cause harm when the vehicle comes to a sudden stop.

7 Claims, 15 Drawing Sheets

DECORATIVE REAR WINDOW PROTECTOR FOR TRUCKS

BACKGROUND OF THE INVENTION

1. Field of the Invention

The present invention relates to aesthetically pleasing and functional rear window protectors for cab-equipped trucks. More particularly, the inventive rear window protector includes a main arcuate load-bearing member and one or several smaller arcuate members attached to the main member.

2. Description of the Related Art

Rear window protectors for pickup trucks are well known. Often they are also referred to as "headache racks", carrier racks, cab guards and vehicle safety protectors. Most headache racks provide dual protection, i.e., protection from large objects carried in the bed and protection from debris such as gravel.

U.S. Pat. No. 337,556, issued to Gros on Jul. 20, 1993, U.S. Pat. No. 381,306, issued to Sauerwein on Jul. 22, 1997, and U.S. Pat. No. 393,622, issued to Goertzen on Apr. 21, 1998, all show various ornamental design arrangements of truck cab guards and pet barriers. All of these references, especially Sauerwein, show that the lower portions of the structures are mounted onto the rail surfaces of the truck beds. These racks are mounted outside and immediately behind the rear cab window of the truck.

U.S. Pat. No. 4,405,170, issued to Raya on Sep. 2, 1983, teaches a demountable carrier rack mounted in the rails along the side of the bed of a pickup truck to provide a framework to attach other objects, such as a tarpaulin, or to contain large objects. FIG. 1 of the reference shows a safety protector embodiment including horizontal and vertical support bars.

U.S. Pat. No. 4,564,216, issued to Kinyon et al. on Jan. 14, 1986, teaches a carrier rack using a replaceable grill in which the grill can also be used as a ramp.

U.S. Pat. No. 4,611,824, issued to McIntosh on Sep. 16, 1986, teaches a cab guard mounted into the stake pockets of the truck bed, in which the protective portion is a screen mesh.

U.S. Pat. No. 4,692,845, issued to Widhalm et al. on Sep. 8, 1987, teaches a rear cab bracket for mounting lamps that can withstand the truck flipping over.

U.S. Pat. No. 5,061,000, issued to Haugen et al. on Oct. 29, 1991, teaches a rack for use in the rear of a pickup made from tubular frame members using special connectors for joining the members of the frame.

U.S. Pat. No. 5,258,893, issued to Finneyfrock on Nov. 2, 1993, teaches a cab guard using a mesh screen and including built-in rear brake lights.

U.S. Pat. No. 5,316,190, issued to Bullock on May 31, 1994, teaches an aesthetically pleasing folding utility rack useable on a truck bed.

U.S. Pat. No. 5,882,058, issued to Karrer on Mar. 16, 1999, teaches a modular cargo anchoring structure for use in a truck bed.

None of the prior art cited teach the particular arcuately shaped headache rack structure of the present invention, which provides a support for objects, such as rear brake lights or speakers, and which provides protection for the rear window and cab of a pickup truck from large objects, such as lawnmowers.

None of the above inventions and patents, taken either singularly or in combination, is seen to describe the instant invention as claimed. Thus a decorative rear window protector for trucks solving the aforementioned problems is desired.

SUMMARY OF THE INVENTION

The present invention is directed to a rear window protector for use in the bed of a pickup truck. The inventive structure includes a main arcuately shaped member, and one or several smaller arcuate members, and protects the occupant(s) of the cab of a pickup truck from large objects that may move forward towards the cab from the bed of the truck, especially when the truck comes to a sudden stop.

Accordingly, it is a principal object of the invention to provide a rear window protector for a pickup truck, in which the protector includes a main arcuately shaped load-bearing member.

It is another object of the invention to provide a rear window protector as described which also includes one or several additional arcuate structural members attached to the main arcuate member.

It is a further object of the invention to provide the above rear window protector with any of various smaller objects attached onto the arcuate members, including rear brake lights, sound speakers and decals.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a rear window protector as shown in FIGS. 1–12.

Figure 1:
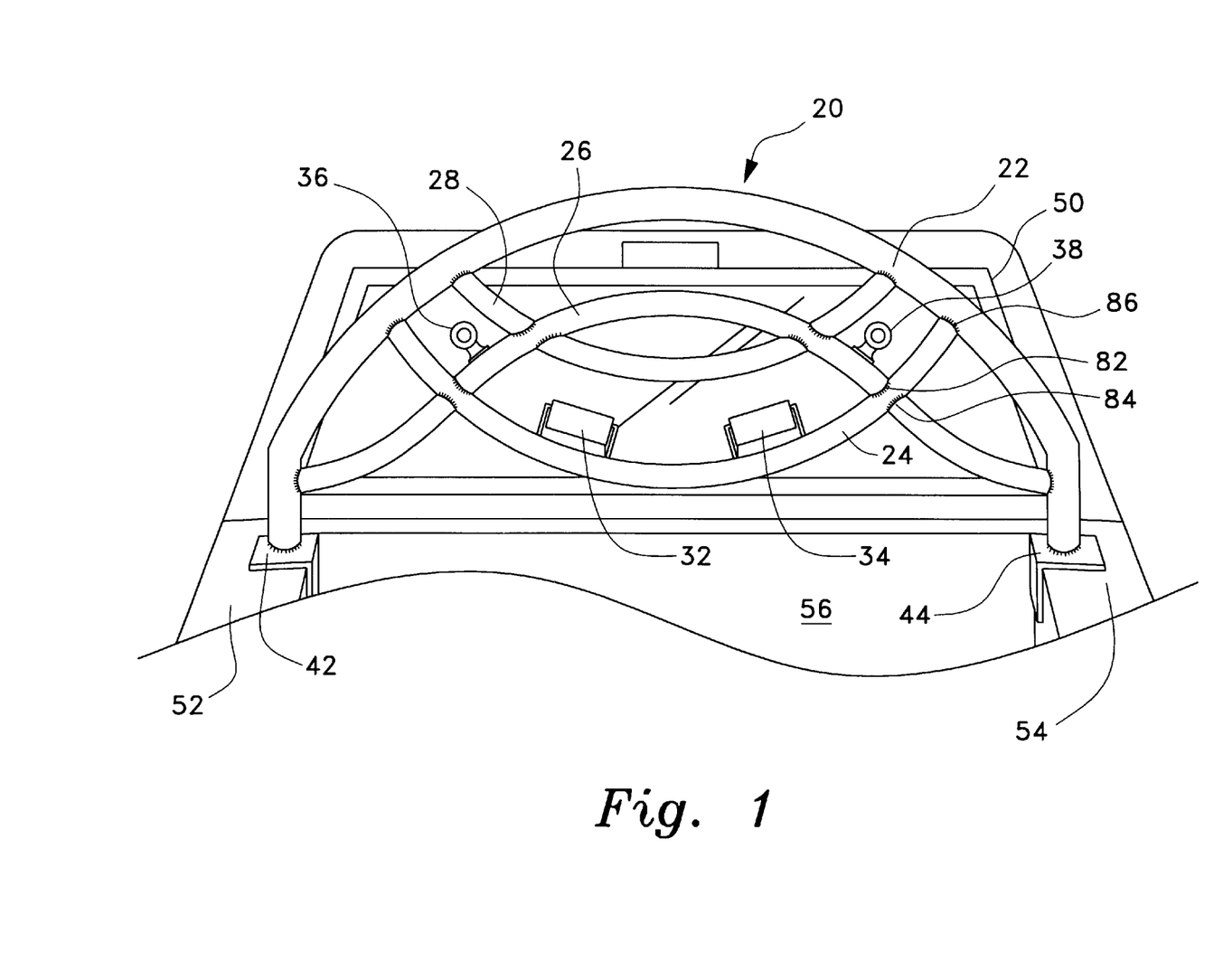
FIG. 1 is an environmental, perspective view of a decorative rear window protector for trucks according to the present invention.

FIG. 1 shows the rear window protector 20 for a pickup truck, including rear flood lights 36 and 38 and sound speakers 32 and 34 attached to the structure. The main load-bearing member 22 is shown as being arcuately shaped. The ends of the main member 22 are attached to the mounting brackets 42 and 44, which, in turn are attached to the side rails, 52 and 54 of the truck bed. The entire rear window protector is mounted immediately behind the rear window 50 of the cab of the truck.

The main arcuate member 22 is made by bending a length of steel tubing, in this case, 2-½" OD round tubing, sufficient to be able to span the truck bed. The smaller arcuate tubular pieces, 24, 26 and 28 are either 2" OD or 2-½" OD and are tack welded using known welding techniques, e.g., TIG or MIG, to the main member and to each other as shown at points 82, 84 and 86, for example, so that all of the pieces of the structure lie in the same plane. In order to obtain this coplanar arrangement, the ends of each of the tubular pieces are cut and fishmouthed to fit precisely onto the adjoining piece.

Figure 13A:
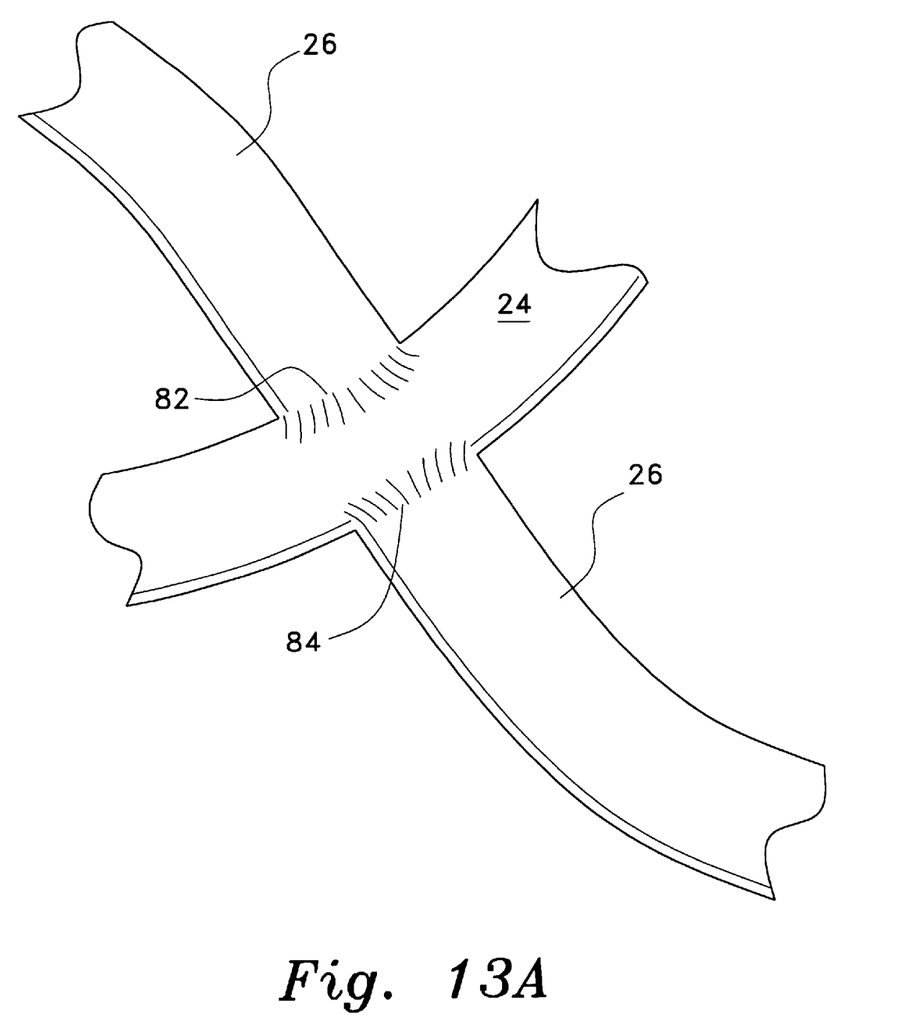
FIGS. 13A and 13B are fragmented elevation views showing details of the structure at the joints between tubes in a decorative rear window protector for trucks according to the present invention.
Figure 13B:
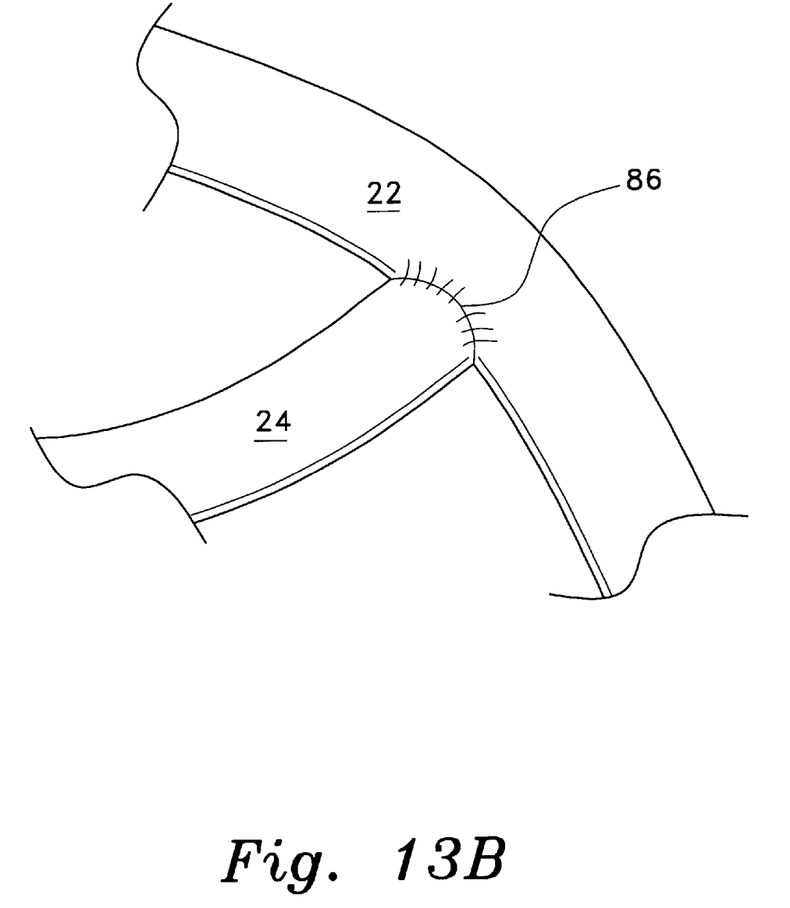

A detail view of an example of the weld between adjoining arcuate pieces 24 and 26 is shown in FIGS. 13A and 13B. FIG. 13A shows the welds 82 and 84 where the fishmouthed cut ends of member 26 are welded onto member 24. Similarly, the fishmouthed cut end of member 24 is welded to the main arcuate member 22 at the weld 86.

Figure 14:
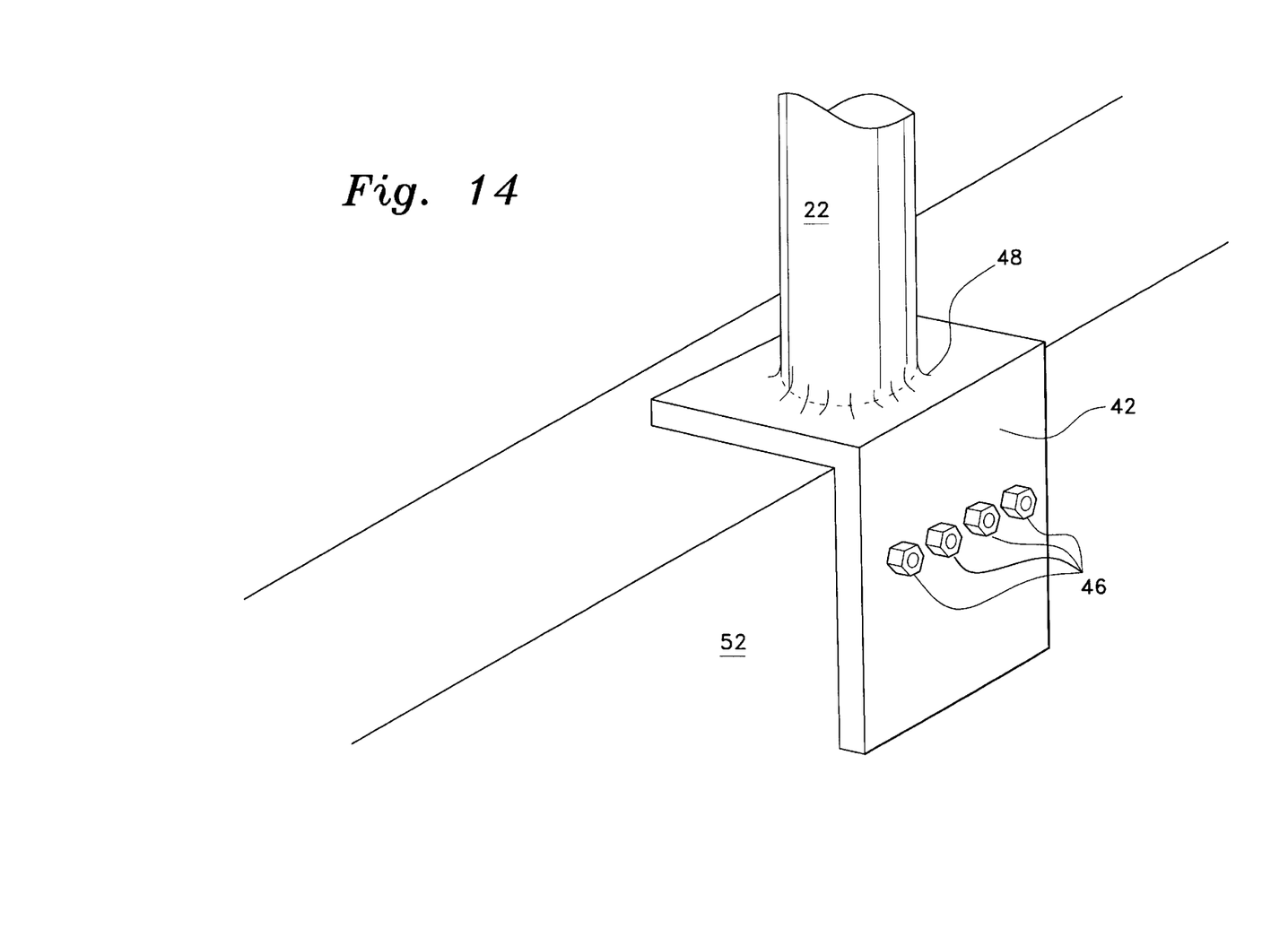
FIG. 14 is a fragmented perspective view showing a mounting bracket for a decorative rear window protector for trucks according to the present invention.

FIG. 14 shows a detailed view of the weld point 48 at which the main arcuate member 22 meets the mounting bracket 42. The mounting bracket is bolted to the bed rail 52 using bolts 46.

Figure 2:
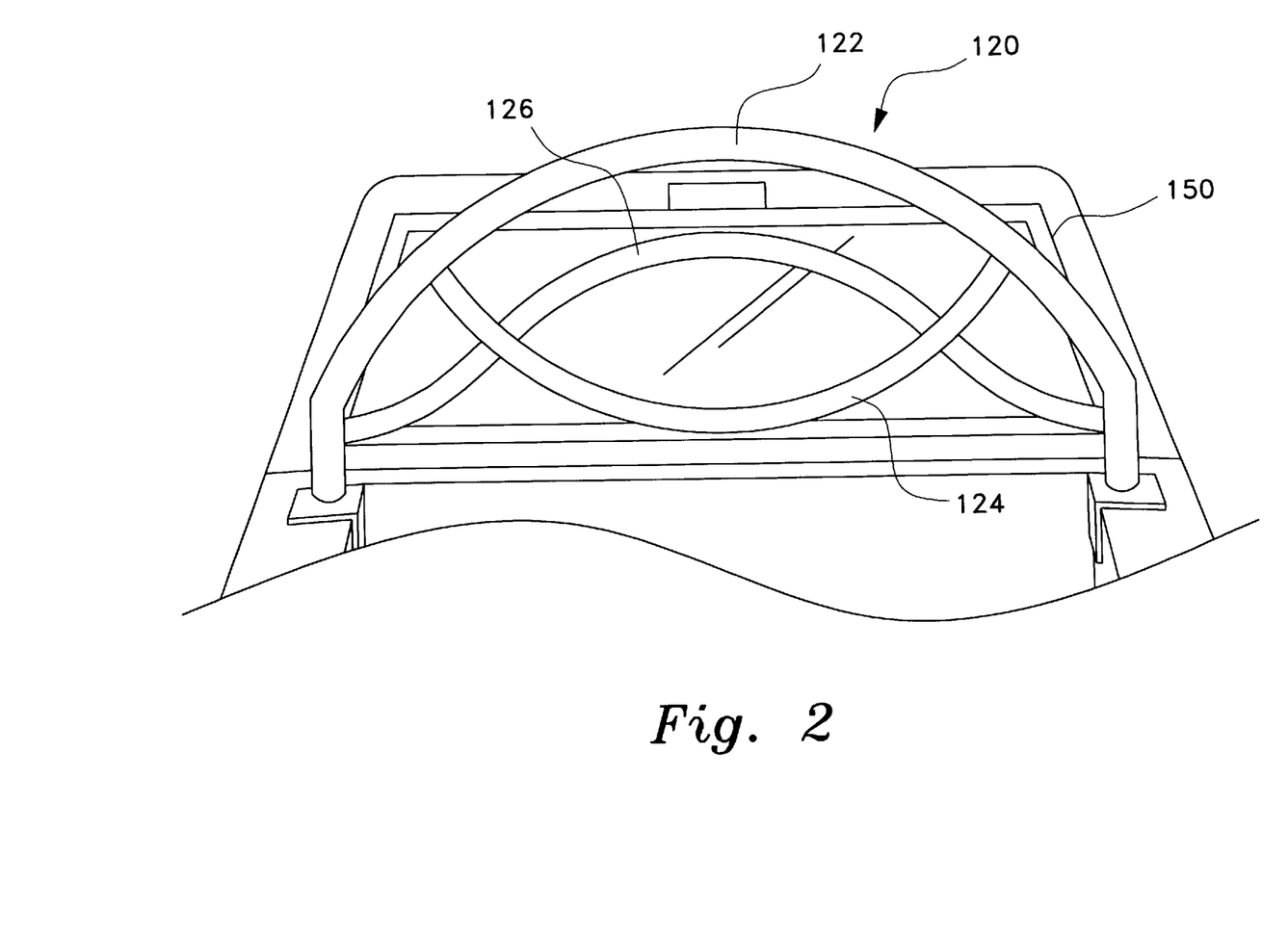
FIGS. 2, 3, 4, 5, 6, 7, 8, 9, 10, 11 and 12 show second through twelfth alternative embodiments, respectively, of a decorative rear window protector for trucks according to the present invention.
Figure 3:
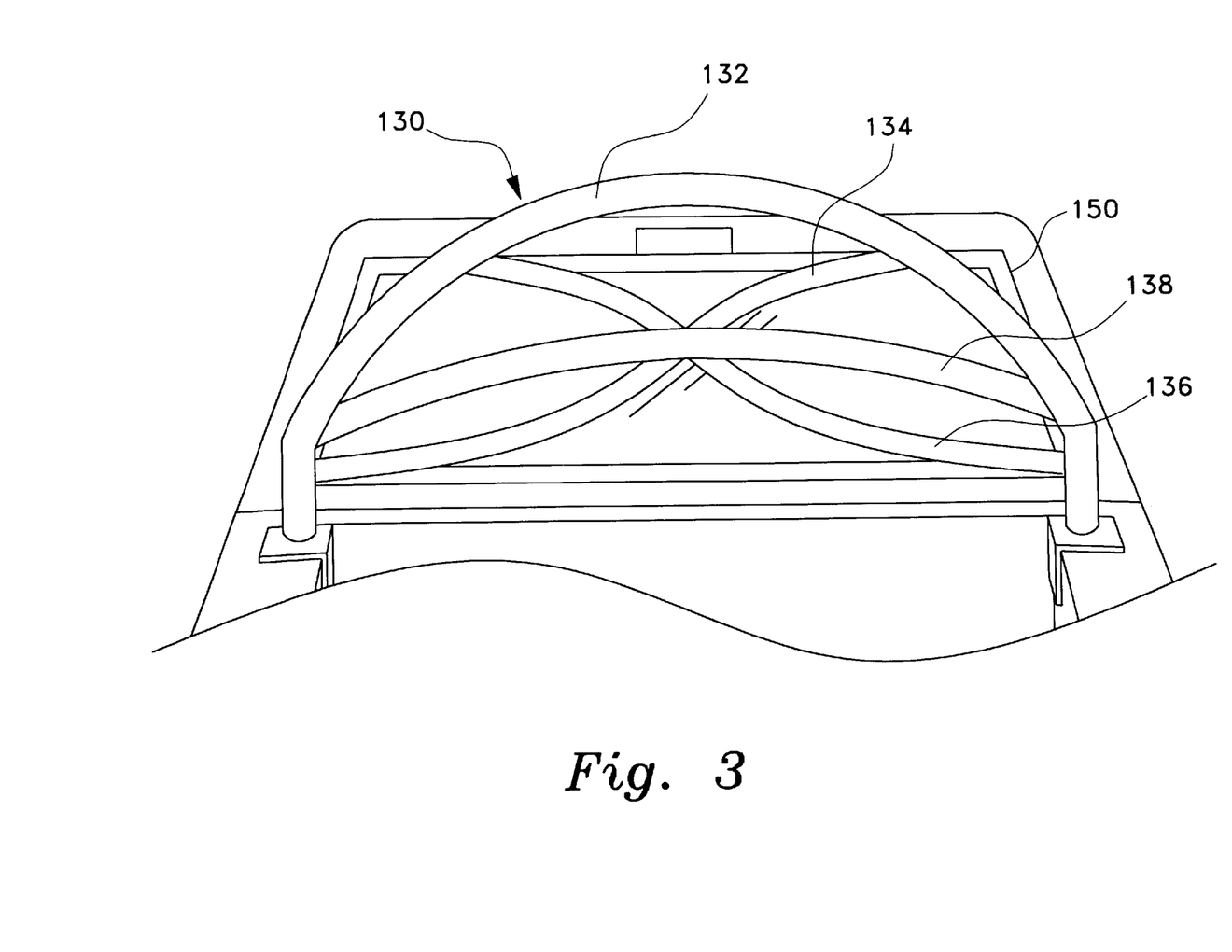

FIGS. 2–12 show various alternative arrangements of smaller arcuate members attached to the main arcuate member. In FIG. 2, smaller members 124 and 126 are welded to the main arcuate member 122 and to each other to form the second arrangement of rear protector 120, which is mounted behind rear window 150. In FIG. 3, smaller members 134 and 136 are welded to main member 132 and to each other to form the third arrangement of rear window protector 130. In this case, member 138 is preferably a 2-½" OD tubular member, the same dimensions as main member 132. The remaining smaller members are preferably 2" OD.

Figure 4:
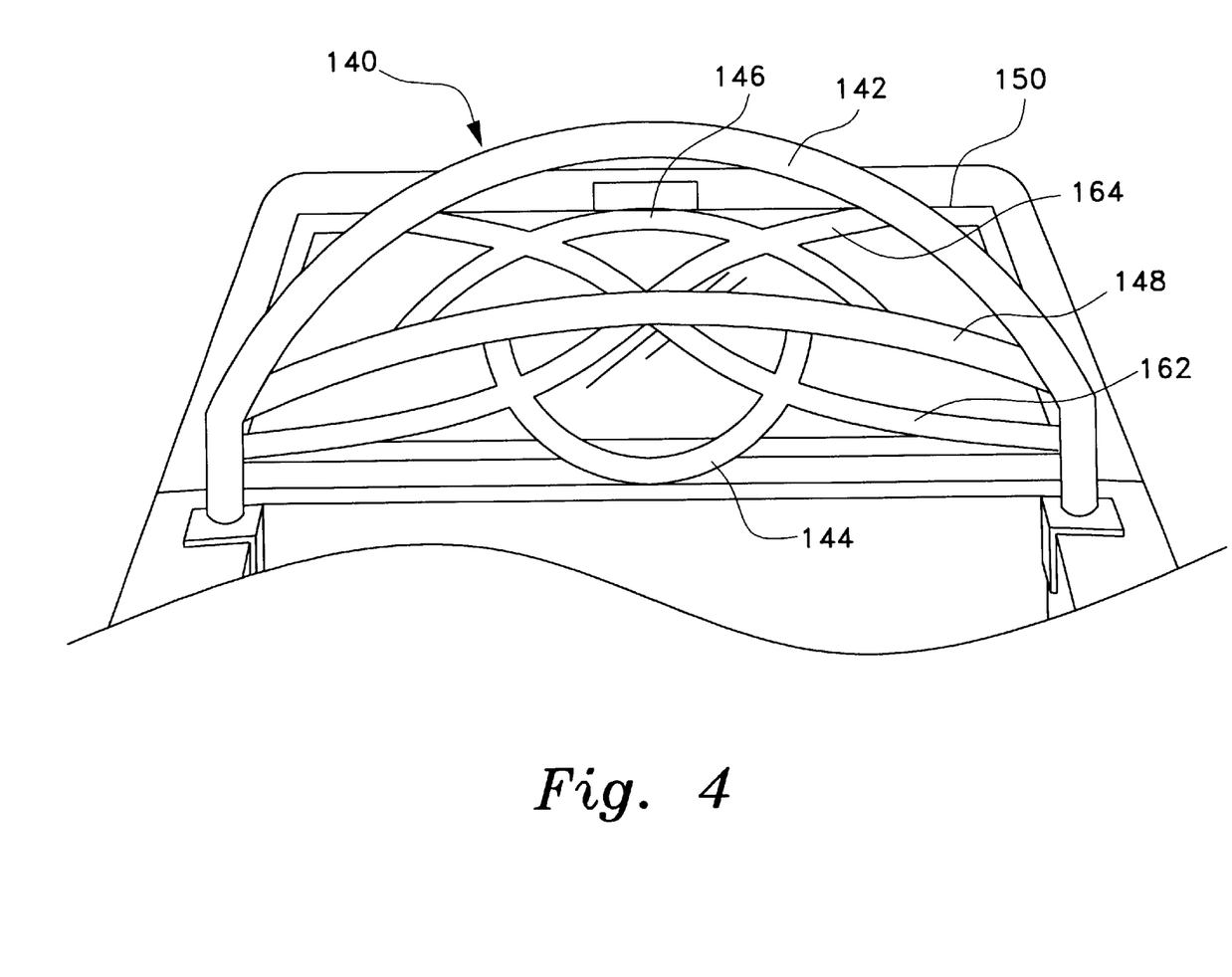

In FIG. 4, smaller members 144, 146, 162 and 164 (all 2" OD) are welded to main member 142 and intermediate member 148, which are 2-½" OD steel tubes, to form the fourth arrangement of the rear window protector 140.

Figure 5:
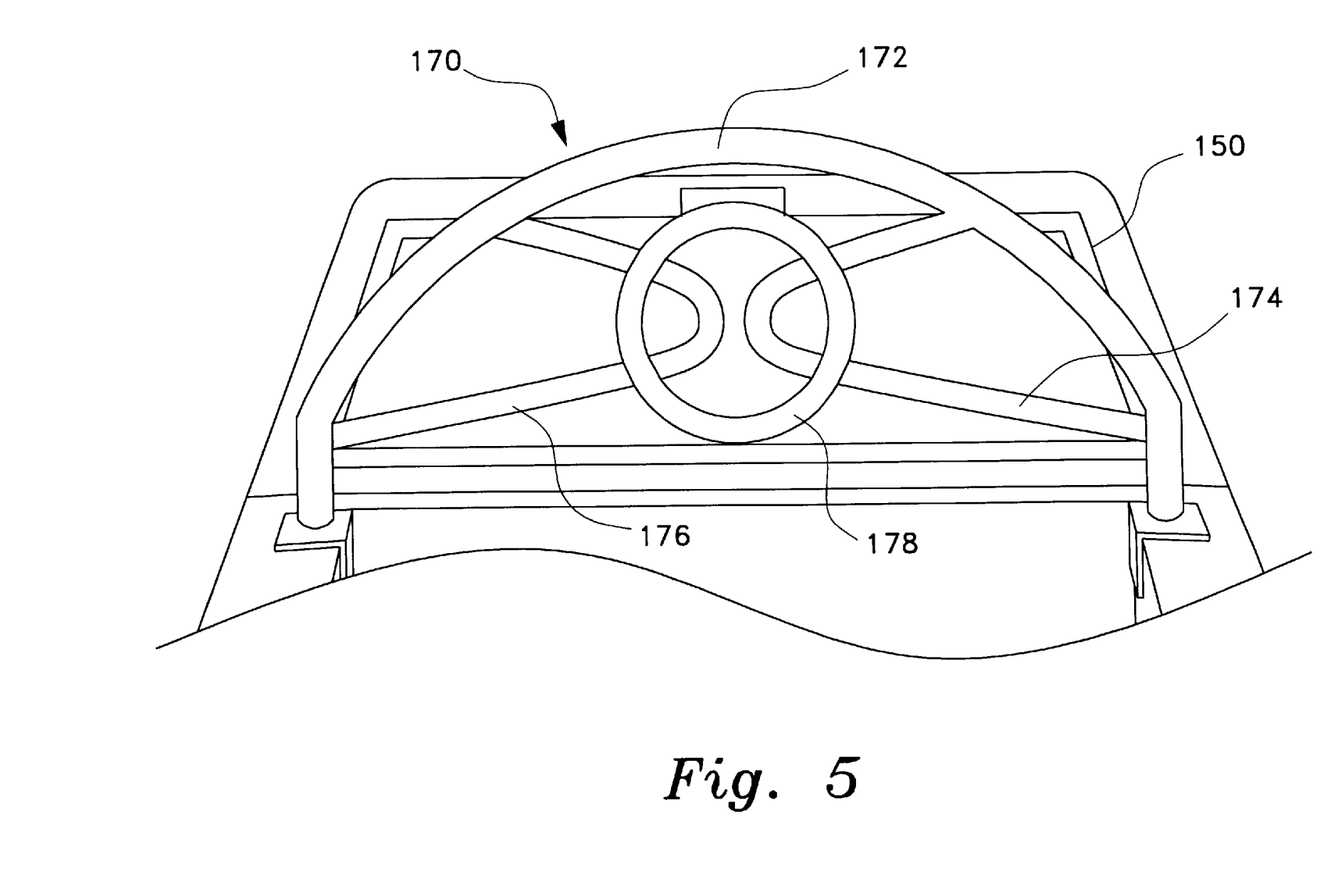
Figure 6:
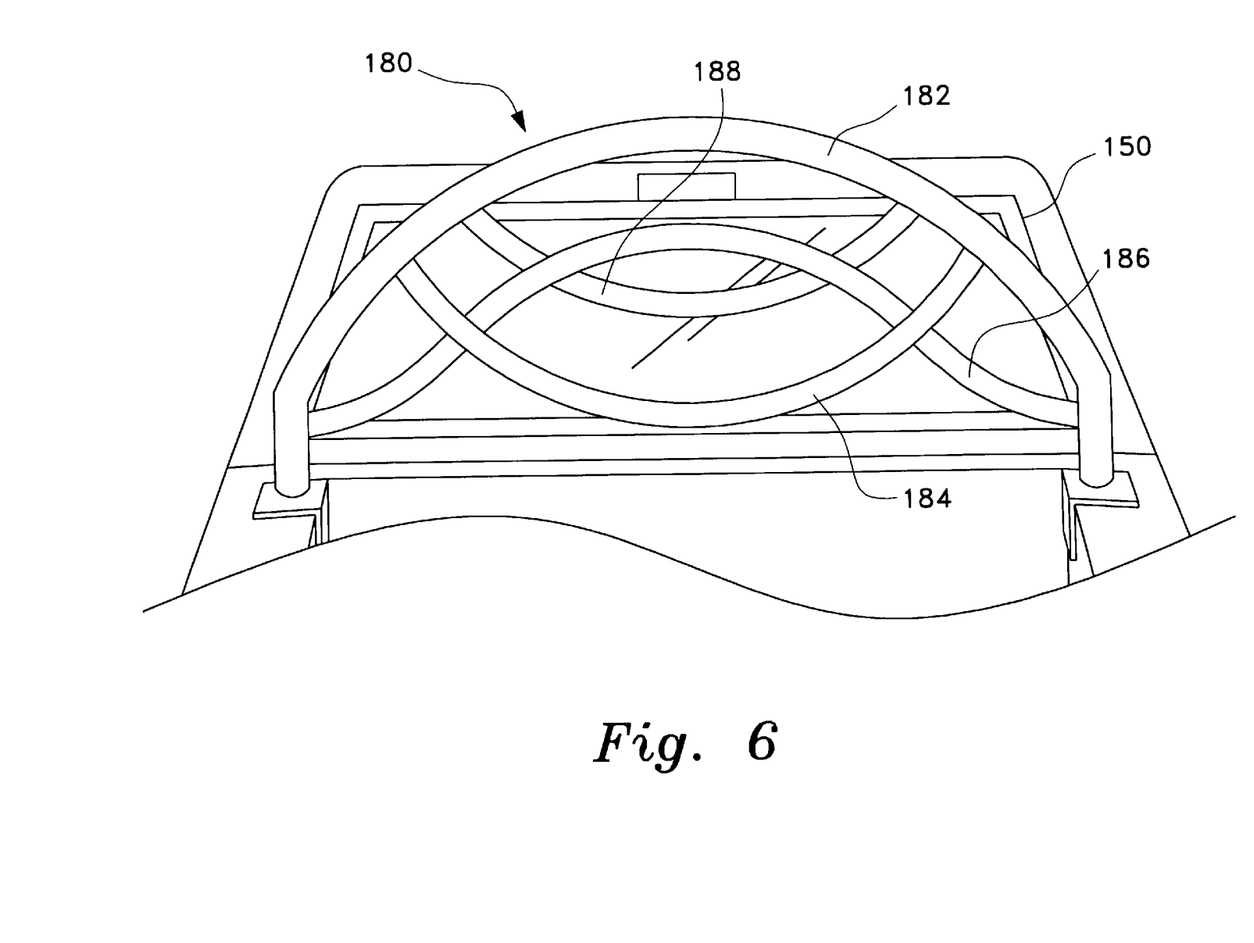
Figure 7:
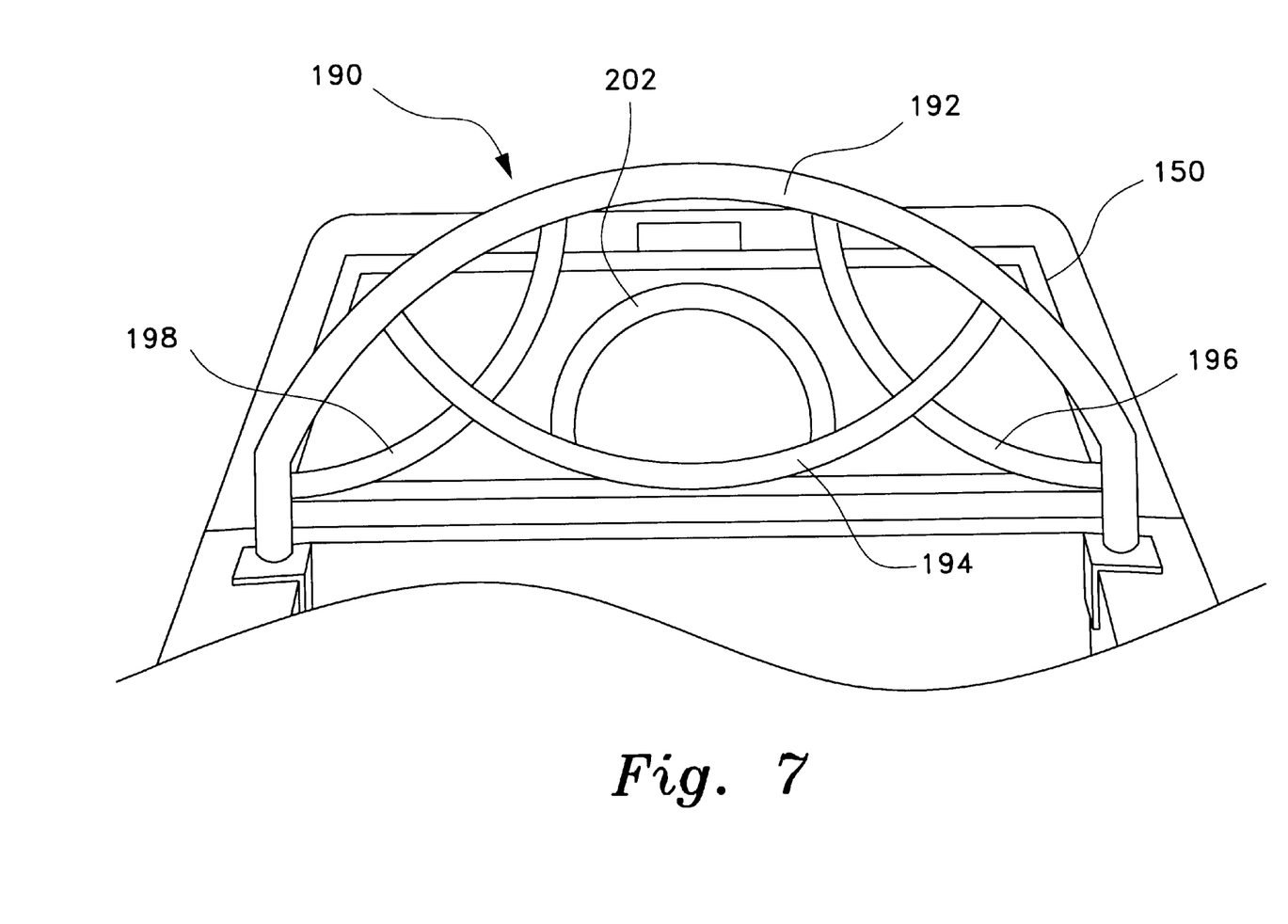

In FIG. 5, smaller members 174, 176 and 178, are welded to main member 172 to form the fifth arrangement of the rear window protector 170. In FIG. 6, smaller members 184, 186 and 188 are welded to main member 182 to form the sixth arrangement 180. In FIG. 7, smaller members 194, 196, 198 and 202 are welded to main member 192 to form the seventh arrangement 190.

Figure 8:
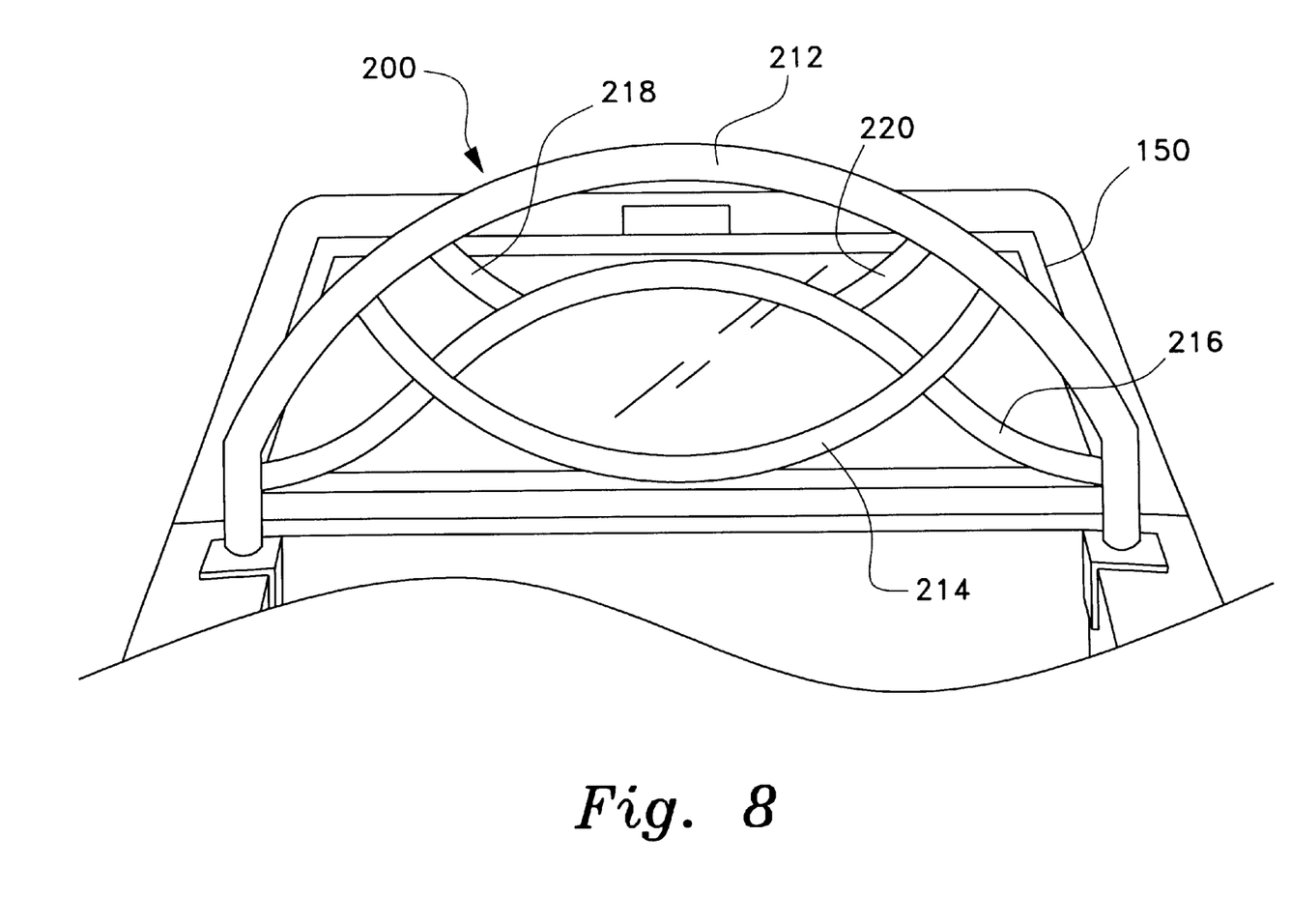
Figure 9:
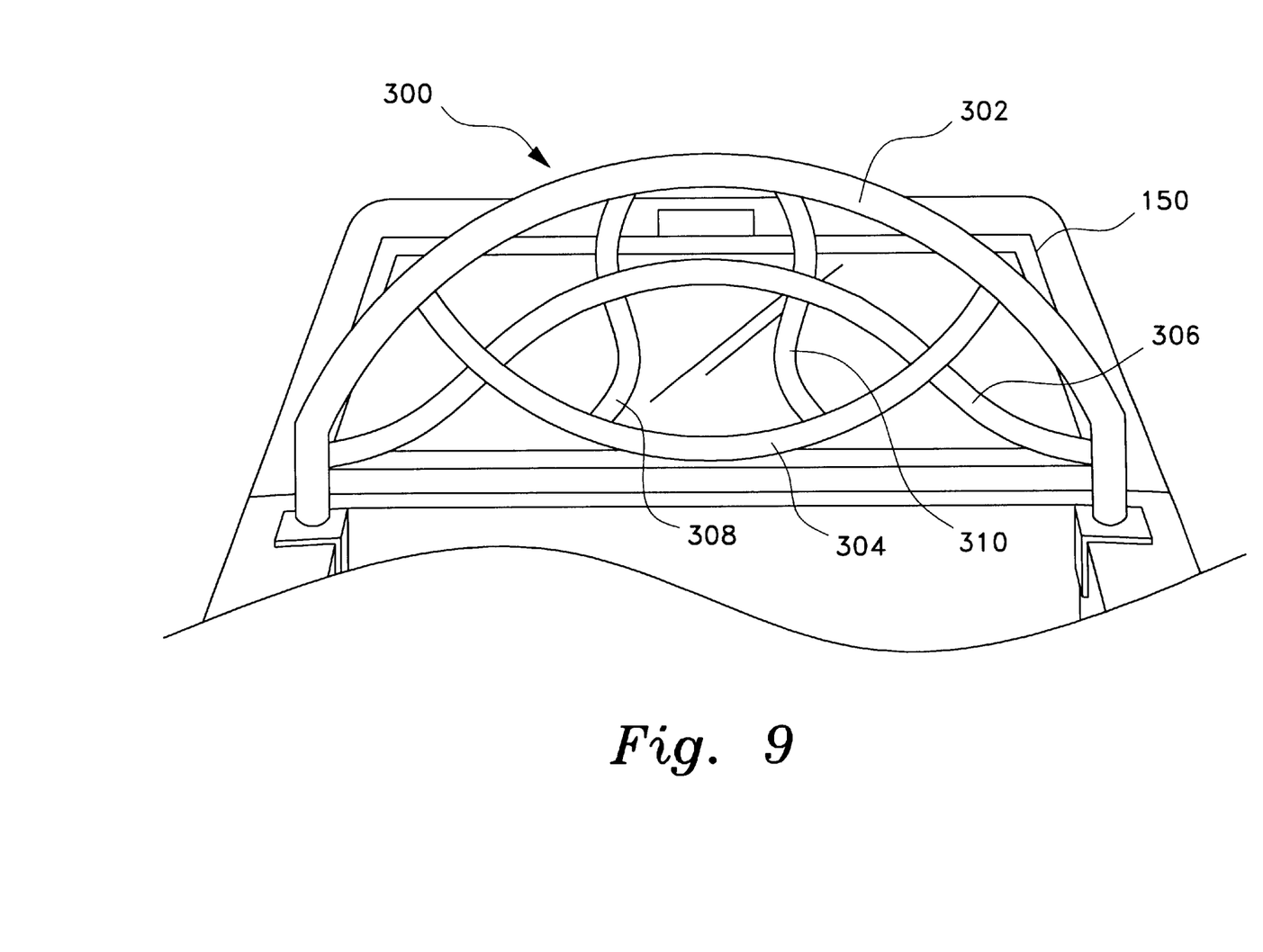
Figure 10:
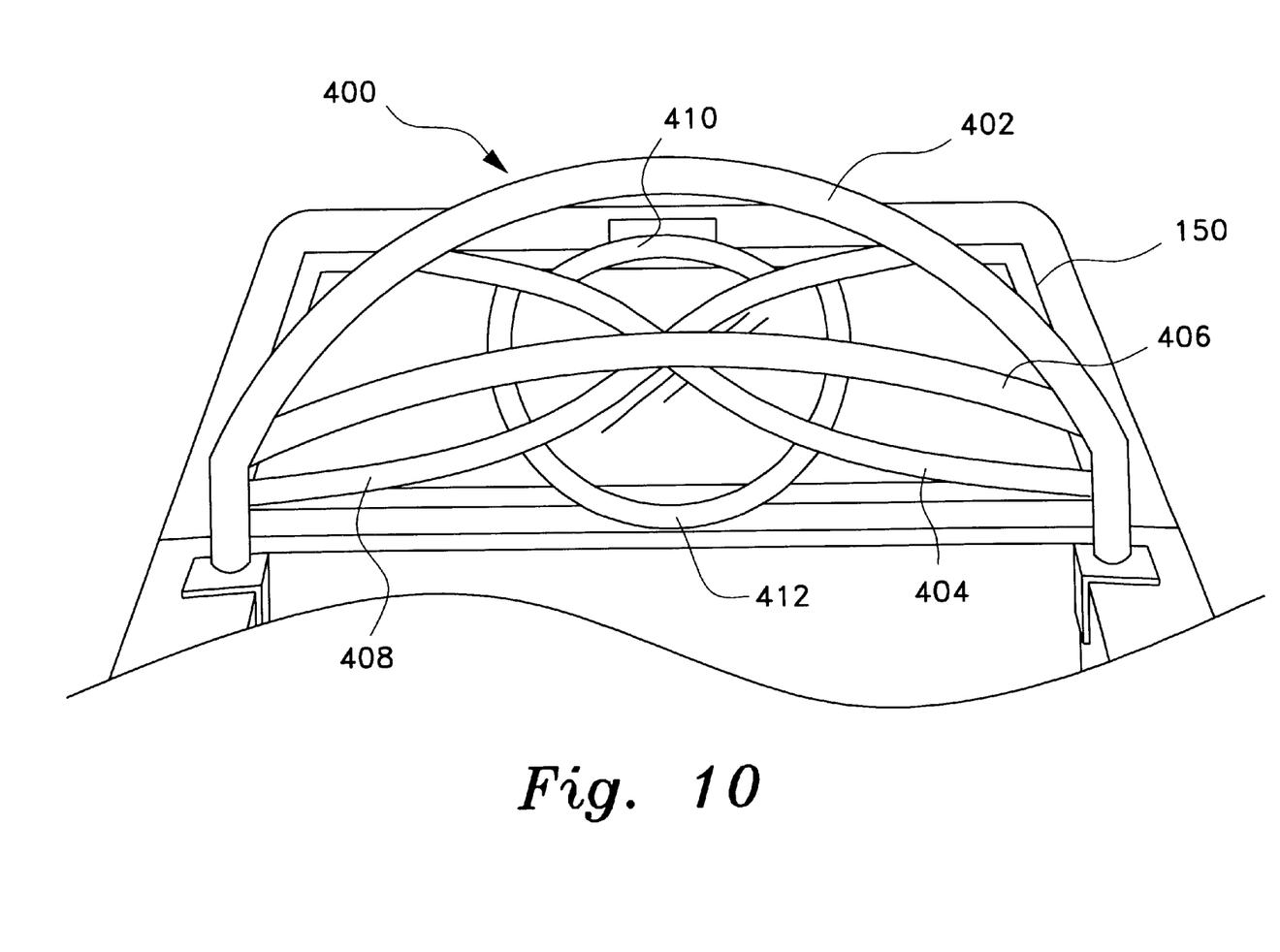
Figure 11:
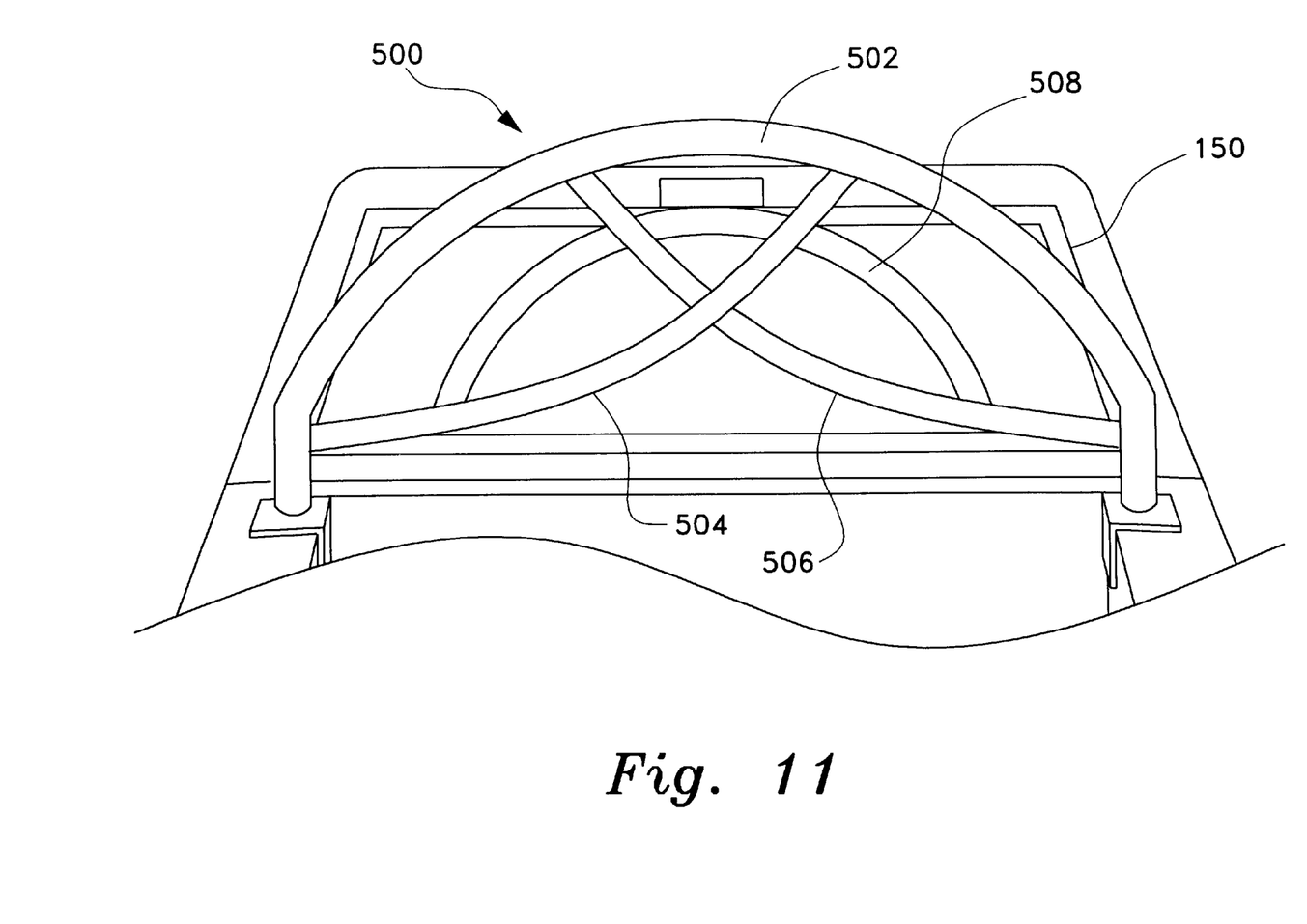
Figure 12:
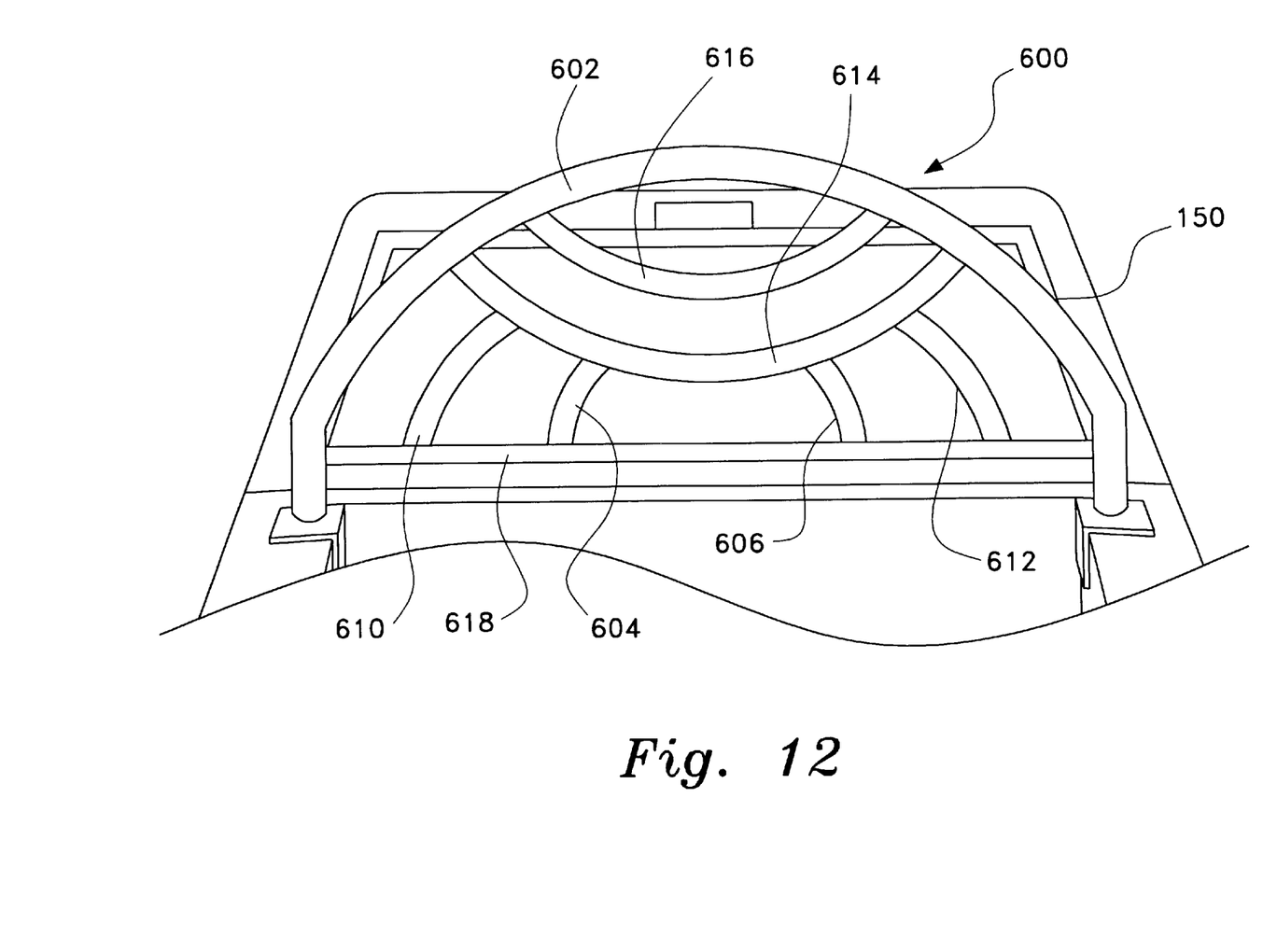

In FIG. 8, the smaller members 214, 216, 218 and 220 are welded to main member 212 to form an eighth arrangement 200. In FIG. 9, smaller members 304, 306, 308 and 310 are welded to main member 302 to form the ninth arrangement 300. In FIG. 10, smaller members 404, 408, 410 and 412 are welded to larger intermediate member 406 and main member 402 to form the tenth arrangement 400. In FIG. 11, smaller members 504, 506 and 508 are welded to main member 502 to form the eleventh arrangement 500. In FIG. 12, the twelfth arrangement 600 is formed by welding intermediate members 614, 616, and 618 to main member 502, and welding small members 604, 616, 610, and 612 between the intermediate members 614 and 618.

In all the above arrangements, the ends of all attached members are cut and fishmouthed to match the tubular member to which they are being welded, so that all of the tubular members in each embodiment are coplanar. The tubular members are roll bent to ensure smooth arcuate formations. Also, the welds can be polished and the entire structure painted, polished and chromed to make the welds invisible.

Although all of the members shown are preferably made using round tubular steel, other materials, such as aluminum and square tubing can be used as well. Additionally, a screen made of expanded metal can be applied between the rear protector and the cab to protect the occupant of the cab from smaller debris, such as gravel.

It is to be understood that the present invention is not limited to the embodiments described above, but encompasses any and all embodiments within the scope of the following claims.

I claim:

1. A rear window protector for pickup trucks having a bed and rails, the protector comprising:

a main member having opposing ends, the main member being a length of tubing formed into an arch having a substantially continuous curvature of a generally constant radius, the arch defining a planar concave interior area, the opposing ends being essentially parallel to one another;

a pair of mounting brackets, one of said mounting brackets attached to each of said opposing ends of said main member; and at least one intermediate member disposed within said planar concave interior area, the at least one intermediate member being a length of tubing formed into an arc having a continuous curvature of a generally constant radius, the at least one intermediate member having opposing ends and having a length less than the main member, wherein the ends of the at least one intermediate member are attached to the main member.

2. The rear window protector of claim 1, further including at least one rear light attached to the protector.

3. The rear window protector of claim 1, further including at least one sound speaker attached to the protector.

4. The rear window protector of claim 1, further including at least one emblem attached to the protector.

5. The rear window protector of claim 1, further comprising at least one smaller member disposed within said planar concave interior area, the at least one smaller member being a length of tubing formed into an arc having a continuous curvature of a generally constant radius, the at least one smaller member having opposing ends and having a length less than the main member, wherein one end of the at least one smaller member is attached to said main member, and the other end of the at least one smaller member is attached to one of said at least one intermediate member.

6. The rear window protector of claim 1, further comprising at least one smaller member, the at least one smaller member being a length of tubing formed into an arc having a continuous curvature of a generally constant radius, the at least one smaller member having opposing ends and having a length less than the main member, wherein the ends of the at least one smaller member are attached to said intermediate member.

7. The rear window protector of claim 1, wherein each of said mounting brackets has a first plate attached to said main arcuate tubular member, and a second plate joined to said first plate and extending perpendicular to said first plate and away from said main arcuate tubular member, so as to form an L shaped bracket.

* * * * *